United States Patent

Fresia et al.

[15] 3,653,119
[45] Apr. 4, 1972

[54] METHOD OF PRODUCING ELECTRICAL CAPACITORS

[72] Inventors: Elmo James Fresia, Williamstown; Jeremiah E. Desmond, Boston, both of Mass.

[73] Assignee: Sprague Electric Company, North Adams, Mass.

[22] Filed: Dec. 28, 1967

[21] Appl. No.: 694,035

Related U.S. Application Data

[63] Continuation-in-part of Ser. No. 358,099, Mar. 7, 1964, abandoned.

[52] U.S. Cl. ............................29/585, 29/25.42, 29/498, 29/504, 29/570, 117/200, 204/37 R, 204/38 A
[51] Int. Cl. ..................H01g 13/00, C23b 9/02, B23p 17/04
[58] Field of Search ..............204/38, 38.1, 37, 35; 29/584, 29/585, 25.41, 25.42, 570; 117/200; 317/230

[56] References Cited

UNITED STATES PATENTS

| | | | |
|---|---|---|---|
| 3,225,417 | 12/1965 | Lagercrantz | 29/25.31 |
| 3,279,030 | 10/1966 | Wagner et al. | 29/25.31 |
| 3,333,326 | 8/1967 | Thomas et al. | 204/37 |
| 3,339,272 | 9/1967 | MacIver et al. | 29/571 |
| 3,427,196 | 2/1969 | Behrend | 117/200 |

*Primary Examiner*—Wayne A. Morse, Jr.
*Attorney*—Connolly and Hutz, Vincent H. Sweeney, James Paul O'Sullivan and David R. Thornton

[57] ABSTRACT

Simultaneously subjecting an electrical capacitor comprising, a valve metal electrode, an anodic oxide layer thereon, and a semiconducting oxide counterelectrode, to a temperature of 250°–400π$\zeta$ c. while applying a bias across the anodic oxide.

16 Claims, No Drawings

| | | | | |
|---|---|---|---|---|
| 375 | 24 | −4.0 | +3.6 | +7.8 |
| 400 | 31 | −5.0 | +7.0 | +16.0 |
| 420 | 54 | −10.0 | +11.0 | +21.0 |
| Control | 60 | −13.5 | +11.0 | +19.0 |

It will be noted that there is no improvement in RC and little improvement in the percent capacitance change between the control unit and the unit treated at 200° C. The table shows that somewhere between 200° and 275° C. a significant improvement in both characteristics begin, continuing through a minimum at about 350° C. and deteriorating beyond 400° C. Thus the optimum temperature range is from about 250° C. to about 400° C.

If, after the treatment of the present invention, the capacitor units are ever subjected to a temperature of 250° C. or above without simultaneously subjecting the units to the voltage or current limitations of this invention, the benefits gained by the instant process will be nullified.

The following example shows the effective current range of the present process.

EXAMPLE IV

Seven 47 microfarads-35 volt capacitor units were produced as in Example I and heat-treated at 350° C. in a molten solder bath for a period of about 10 minutes. Various currents, as shown in the following table, were permitted to flow through the units while they were being heat-treated. The characteristics of the treated units are compared in the table below, with each other and with an untreated control unit prepared by the process of Example I.

TABLE 3

| Current (ma.) | RC in ohm μf | % Capacitance Change as compared with that at 25° C. | | |
|---|---|---|---|---|
| | | −80° C. | +85° C. | +125° C. |
| 0 (control) | 64 | −14.0 | +11.2 | +19.0 |
| 0.050 | 38 | −9.0 | +7.0 | +13.2 |
| 0.100 | 31 | −7.0 | +6.0 | +11.0 |
| 0.500 | 23 | −4.5 | +5.0 | +8.5 |
| 1.0 | 20 | −4.0 | +4.2 | +7.0 |
| 5.0 | 18 | −3.2 | +3.7 | +6.5 |
| 10.0 | 17.5 | −3.0 | +3.2 | +6.5 |
| 100.0 | 18 | −3.2 | +3.7 | +6.7 |

The table shows that a significant improvement, as compared with the control sample, occurs beginning below 0.050 ma. Beyond 10 ma there does not appear to be any improvement. Thus, the optimum current range is considered to be about 0.001 to about 10 ma.

Instead of controlling current, the voltage may be maintained within a critical range and produce the desired improvement, as shown by the following example.

EXAMPLE V

Seven 47 microfarads-35 volt capacitor units formed to 150 V, were prepared by the process of Example I and heat-treated at 350° C. in a molten solder bath for a period of about 10 minutes. While being heated, the individual capacitor units were subjected to different voltages. The percentages given in the table below are percentages of the original formation voltage. The voltage was measured across the capacitor, i.e. manganese oxide surface to the positive lead. The characteristics of the treated units are compared with each other and with an untreated control unit prepared by the process of Example I.

TABLE 4

| % of formation Voltage | RC in ohm μf | % Capacitance Change as compared with that at 25° C. | | |
|---|---|---|---|---|
| | | −80° C. | +85° C. | +125° C. |
| 0 | 59 | −12.6 | +11.6 | +17.6 |
| 0.66 | 47 | −8.2 | +8.2 | +14.6 |
| 3.4 | 26 | −4.4 | +4.0 | +7.2 |
| 5.2 | 21 | −3.0 | +3.3 | +6.6 |
| 6.9 | 19 | −2.5 | +2.2 | +5.1 |
| 8.6 | 19 | −2.8 | +2.3 | +4.1 |
| 10.3 | 16 | −2.6 | +2.0 | +3.7 |
| 13.8 | 18.6 | * | * | * |

From the data presented it is clear that any voltage beyond 0 percent of the formation voltage and less than about 15 percent produces an improvement in the RC and percent capacitance change. An optimum range is from about 0.7 to about 15.0 percent.

The following example shows the optimum heat treatment time.

EXAMPLE VI

Five 47 microfarads-35 volt capacitor units were prepared by the process of Example I and then heat-treated in molten solder at 350° C. at 1 ma. The tantalum pellet was made the anode. The time was varied for individual units as shown in the following table. As in the preceding examples an untreated control sample prepared by the process of Example I was also compared.

TABLE 5

| Time in minutes | RC in ohm μf | % Capacitance Change as compared with that at 25° C. | | |
|---|---|---|---|---|
| | | −80° C. | +85° C. | +125° C. |
| 0 (control) | 58 | −12.1 | +10.1 | +16.7 |
| 2 | 38 | −10.9 | +4.5 | +7.8 |
| 5 | 18 | −5.6 | +2.7 | +4.9 |
| 10 | 17 | −3.6 | +2.3 | +5.0 |
| 20 | 17 | −2.7 | +2.3 | +4.9 |
| 30 | 18 | −2.7 | +2.6 | +5.5 |

It is obvious from this data that any time beyond zero time and up to about 30 minutes will result in improved characteristics. The optimum heating range is considered to be from about 1 to 15 minutes.

The formation and reformation electrolytes employed may be any of the prior art electrolytes. Depending upon the capacitance desired and anode size the formation voltage will be within the range of about 14 to about 400 volts. Reformation in an aqueous system, as is common practice in the art, is carried out within a temperature of from 0° to 100° C., more particularly between 25° and 90° C. By semiconducting oxide precursor as used herein is meant any material which is decomposable to the semiconducting oxide. For example, manganous nitrate is decomposable to manganese dioxide or a mixture of manganese oxides having a substantial proportion of the dioxide. Manganese oxide, as used herein, is intended to include manganese dioxide or a mixture of manganese oxides having a substantial proportion of the dioxide.

While the specific examples herein have shown the heat source to be either an oven or molten solder, it is to be understood that any heat source, capable of subjecting the units to controlled heat under the conditions specified, is contemplated.

METHOD OF PRODUCING ELECTRICAL CAPACITORS

CROSS-REFERENCE TO RELATED APPLICATION

This application is a continuation-in-part of application Ser. No. 358,099, filed Mar. 7, 1964, now abandoned.

BACKGROUND OF THE INVENTION

This invention relates to a method of producing electrolytic capacitors and more particularly to the improvement of the electrical characteristics of solid electrolyte capacitors.

The so-called solid electrolyte capacitors are produced by applying a semiconducting oxide coating to the anodic oxide layer of a porous metal pellet, e.g. tantalum, and electrolytically reforming said anodic oxide. The semiconducting oxide forms an intimate contact of a relatively conductive electrode material with the thin dielectric anodic oxide film so that the thin dielectric separates the anode from the semiconducting oxide electrode.

While capacitors of the above-described type are highly commercial, they do have certain inherent undesirable characteristics which the art would like to see eliminated or at least minimized. Among these undesirable characteristics are excessive variations in capacitance over extended temperature ranges and high dissipation factor.

It is an object of the present invention to present an improved process for the manufacture of solid electrolyte capacitors.

Another object is to provide a method of producing solid electrolyte capacitors having improved temperature coefficient of capacitance characteristics over an extended temperature range.

Yet another object is to present a process for a solid electrolyte capacitor having a comparatively low dissipation factor.

Other objects and advantages of the present invention will be made obvious to those skilled in the art by the following detailed description.

SUMMARY OF THE INVENTION

In general, the process of the present invention provides a heat treatment under bias of a semiconductive oxide coated, anodized valve metal electrode, after said coated electrode has been finally reformed. More particularly, the process involves applying a semiconducting oxide coating to the anodic oxide coating of a tantalum electrode, preferably a porous tantalum pellet. Thereafter, electrolytically reforming said anodic oxide. After reforming the anodic oxide, the coated electrode is subjected to a temperature within the range of about 250° C. to about 400° C. This heat treatment is carried out while making the tantalum the anode and applying a bias sufficient to produce a voltage across the anodic oxide of up to about 15 percent of the original anodization voltage. Stated in another way, the heat treatment is carried out while making the tantalum the anode and applying a voltage sufficient to produce a current through the treated body of up to about 10 milliamperes.

DETAILED DESCRIPTION OF THE INVENTION

The following description will serve as an example of the formation of a solid electrolyte capacitor of the type which may be improved upon by the process of this invention.

EXAMPLE I

A porous tantalum pellet was anodized (formed) to about 150 volts. With the particular size anode employed this provides a dielectric oxide coated anode for a finished capacitor having a rating of 47 microfarads-35 volts d.c. The formed anode was impregnated with a 58 percent aqueous solution of manganous nitrate. This unit was then fired in a kiln at a temperature between about 300°–450° C. in order to decompose the nitrate to manganese oxide. This impregnation-pyrolysis sequence was repeated a number of times in order to insure complete coating of the dielectric tantalum oxide with the semiconducting manganese oxide. The unit was then subjected to an electrolytic reformation step in a 6 percent aqueous solution of boric acid at a voltage within the range of about 55 to 70 volts. This step is common practice in the art and is designed to anodically heal imperfections developed in the tantalum oxide layer during pyrolysis of the manganese oxide precursor. This reformation step reduces the leakage current to a point of usefulness for the capacitor.

After reformation the unit would normally have a cathodic contact material, e.g. graphite and/or silver, applied thereto and the unit canned or otherwise packaged to complete the capacitor manufacture.

The following examples illustrate the process of the present invention. The treatment of the present invention takes place after final reformation in any of the prior art processes, e.g., the process of the foregoing example.

EXAMPLE II

Two tantalum capacitor units were prepared through final reformation by the process of Example I. One unit was completed by applying a cathodic contact and used as the control unit and the other was treated according to the process of the invention. The latter unit was immersed in a molten solder bath which was maintained at a temperature of 350° C. Making the tantalum pellet the anode, a voltage was impressed upon the unit sufficient to cause a current of 1 milliampere (ma) to flow through said unit. The unit was treated in this manner for a period of about 10 minutes. Thereafter, the treated capacitor was removed from the solder bath and a cathodic contact applied thereto. Since solder will not wet manganese oxide, no solder adhered to the unit. The characteristics of both units, which are considered to be representative, are given below.

TABLE 1

| | RC in ohm μf | % Capacitance Change as compared with that at 25° C. | | |
| --- | --- | --- | --- | --- |
| | | −80° C. | +85° C. | +125° C. |
| Control Unit | 64 | −15.6 | +12.1 | +20.6 |
| Treated Unit | 14 | −3.5 | +3.7 | +6.5 |

This data graphically illustrates the worth of the present invention.

The following example shows the effective temperature range of the instant process.

EXAMPLE III

Eight 47 microfarads-35 volt capacitor units were produced as in Example I and heat-treated at different temperatures for a period of about 10 minutes, while under a bias sufficient to produce a current of 1 ma. As in all the examples herein, the tantalum pellet was made the anode. The treated units are compared with each other and with an untreated control unit prepared by the process of Example I, in the table below.

TABLE 2

| Temperatures °C. | RC in ohm μf | % Capacitance Change as compared with that at 25° C. | | |
| --- | --- | --- | --- | --- |
| | | −80° C. | +80° C. | +125° C. |
| 200 | 60 | −12.5 | +10.0 | +16.0 |
| 275 | 41 | −11.5 | +4.5 | +6.5 |
| 300 | 27.5 | −10.0 | +3.0 | +5.4 |
| 325 | 20 | −7.4 | +2.5 | +4.8 |
| 350 | 20 | −4.2 | +3.0 | +6.6 |

A particularly efficacious heat medium is a fused salt bath. Examples of appropriate salt mixtures are a $LiNO_3$-$KNO_3$ mixture with 34 percent of the former and 66 percent of latter and $TlNO_3$-$NaNO_3$ mixture with 35 percent of the former and 65 percent of the latter. It has been observed that a fused salt bath has all of the desired characteristics for use in the present process. It is molten within the required temperature range of the instant process and thus is an effective heat medium. It is conductive, permitting the application of the required bias. The salts are extremely water-soluble, permitting easy removal of any adhering salt from the capacitors. The salt mixture is also stable under the process conditions.

In addition to these characteristics, a unique characteristic makes fused salt baths a preferred process medium. Out of almost every batch of capacitors treated by the present process, a small number of units, i.e. one or two, is extremely leaky. In a molten solder bath, these leaky units constitute high current sites which frequently develope into a direct short. As a consequence either the power source is shorted out or damaged, or the shorted capacitor actually burns. When the unit burns, it often causes nearby units to burn or at least be severely heat damaged.

When a fused salt bath is employed and a leaky unit develops into a shorted unit, the extremely high temperature at this high current site will cause local decomposition of the fused salt. The decomposition products are gaseous in nature and will envelope the shorted unit. This gaseous envelope electrically insulates the unit and the process can continue without interruption. Among the advantages over the use of molten solder are: use of a fused salt permits minimization of the current requirements of the power supply and elimination of the consequences of burned-out units. Employment of a molten fused salt also permits the use of a constant voltage rather than constant current as the biasing source.

Although example I shows the application of the semiconducting manganese oxide to the anodic oxide via pyrolysis of manganous nitrate, it is to be understood that the scope of the invention contemplates the application of any appropriate semiconducting material by any means, e.g. chemical or electrical deposition or precipitation.

The present invention extends to improving tantalum foil, wire, mesh, etc. capacitors and is not limited to porous tantalum pellet capacitors.

While the optimum ranges disclosed herein are applicable to the formed tantalum anode-semiconducting oxide capacitor, it is to be understood that the broad concept of the invention is applicable to capacitors employing other valve metals, e.g. niobium, zirconium, etc. These capacitors will have their own optimum ranges, routinely determinable following the teaching of this invention.

What is claimed is:

1. In the process for producing an electrical capacitor comprising applying a semiconducting oxide coating to the anodic oxide layer of a valve metal electrode; electrolytically reforming said anodic oxide layer; the improvement comprising, after reforming said anodic oxide simultaneously subjecting the coated electrode to a temperature within the range of about 250° C. to about 400° C., and while said valve metal electrode is the anode applying a bias sufficient to produce a voltage drop across the anodic oxide; wherein said voltage drop is up to about 15 percent of the original anodization voltage, wherein said semiconducting oxide coating is applied by impregnating the anodized porous tantalum electrode with a solution of a semiconducting oxide precursor; pyrolyzing said precursor to the semiconducting oxide; and after reforming said anodic oxide, simultaneously subjecting the reformed electrode to a temperature within the range of about 250° C. to about 400° C.; and while the pellet is the anode applying a bias sufficient to produce a current flow through the treated body up to about 10 milliamperes.

2. The process of claim 1 wherein prior to reforming the anodic oxide, the impregnation-pyrolysis sequence is repeated a number of times to insure complete coating of said anodic oxide with the semiconducting oxide.

3. The process of claim 2 wherein said capacitor is subjected to said temperature and said bias for a period of up to about 30 minutes.

4. The process of claim 2 wherein said reformed capacitor is heated to said temperature in a molten solder bath.

5. The process of claim 2 wherein said reformed capacitor is heated to said temperature in an oven.

6. The process of claim 2 wherein said reformed capacitor is heated to said temperature in a molten fused salt bath.

7. The process of claim 6 wherein said fused salt bath is selected from the group consisting of (1) 34 percent $LiNO_3$ and 66 percent $KNO_3$ and (2) 35 percent $TlNO_3$ and 65 percent $NaNO_3$.

8. The process of claim 2 wherein said semiconducting oxide precursor is a manganese oxide precursor; wherein said precursor is pyrolyzed to manganese oxide; and wherein the applied bias is sufficient to produce a voltage drop across the anodic oxide of from about 0.7 to about 15 percent of the original anodization voltage.

9. The process of claim 8 wherein said reformed capacitor is heated to said temperature while under bias for a period of time within from 1 to about 15 minutes.

10. The process of claim 8 wherein said reformed capacitor is subjected to a temperature of about 350° C. in a molten solder bath while under bias sufficient to produce a current flow through the treated body of from about 0.001 to about 10 milliamperes for a period of about 10 minutes.

11. The process of claim 8 wherein said reformed capacitor is subjected to a temperature of about 350° C. in a molten fused salt bath while under a bias sufficient to produce a current flow through the treated body of from about 0.001 to about 10 milliamperes for a period of about 10 minutes.

12. The method of producing electrical capacitors wherein a body of valve-type metal from the group consisting of tantalum, niobium and zirconium is provided with a dielectric oxide layer, onto which oxide layer a semiconductor layer is applied which is covered by a conductive layer, the improvement comprising dipping the valve-type metal body, covered with the dielectric oxide layer and with the semiconductor layer into a metal melt heated to a temperature of from 200° to 400° C., applying a voltage to said metal body and said melt and withdrawing said body after a time sufficient to stabilize the electrical characteristics of said body.

13. The method of producing electrical capacitors wherein a body of valve-type metal is provided with a dielectric oxide layer, onto which oxide layer a semiconductor layer is applied which is covered by a conductive layer, the improvement comprising dipping the valve-type metal body covered with the dielectric oxide layer and with the semiconductor layer into a metal melt, applying a voltage to said metal body and said melt and withdrawing said body after a time sufficient to stabilize the electrical characteristics of said body.

14. The method of producing electrical capacitors wherein a body of valve-type metal is provided with a dielectric oxide layer, onto which oxide layer a semiconductor layer is applied which is covered by a conductive layer, the improvement comprising dipping the valve-type metal body, covered with the dielectric oxide layer and with the semiconductor layer into a metal melt heated to a temperature of at least 150° C. applying a voltage to said metal body and said melt and withdrawing said body after a time sufficient to stabilize the electrical characteristics of said body.

15. The method of producing electrical capacitors wherein a body of valve-type metal from the group consisting of tantalum, niobium and zirconium is provided with a dielectric oxide layer, onto which oxide layer a semiconductor layer is applied which is covered by a conductive layer, the improvement comprising dipping the valve-type metal body, covered with the dielectric oxide layer and with the semiconductor layer into a metal melt heated to a temperature of at least 150° C., applying a voltage to said metal body and said melt and withdrawing said body after a time sufficient to stabilize the electrical characteristics of said body.

16. The method of producing electrical capacitors wherein a body of valve-type metal is provided with a dielectric oxide layer, onto which oxide layer a semiconductor layer is applied which is covered by a conductive layer, the improvement comprising dipping the valve-type metal body, covered with the dielectric oxide layer and with the semiconductor layer into a metal melt heated to a temperature of from 200° to 400° C., applying a voltage to said metal body and said melt and withdrawing said body after a time sufficient to stabilize the electrical characteristics of said body.

* * * * *